No. 726,603. PATENTED APR. 28, 1903.
W. O. WILLIAMS.
SAW.
APPLICATION FILED JUNE 3, 1902.
NO MODEL.

Witnesses
T. P. Britt

Inventor
W. O. Williams
Attorneys

UNITED STATES PATENT OFFICE.

WILLIE O. WILLIAMS, OF LEE, ILLINOIS.

SAW.

SPECIFICATION forming part of Letters Patent No. 726,603, dated April 28, 1903.

Application filed June 3, 1902. Serial No. 110,065. (No model.)

*To all whom it may concern:*

Be it known that I, WILLIE O. WILLIAMS, a citizen of the United States, residing at Lee, in the county of Dekalb, State of Illinois, have invented certain new and useful Improvements in Saws; and I do hereby declare the following to be a full, clear, and exact description of the invention, such as will enable others skilled in the art to which it appertains to make and use the same.

This invention relates to hand sawing-machines; and it has for its object to provide a construction including a circular saw equipped with mechanism for rotating it by operating a reciprocatory push-bar, a further object of the invention being to provide a construction of this nature which will be strong and durable and at the same time will be cheap and simple in construction.

Figure 1:
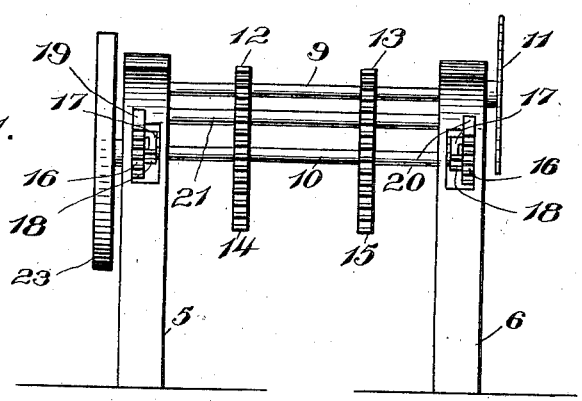
Figure 2:
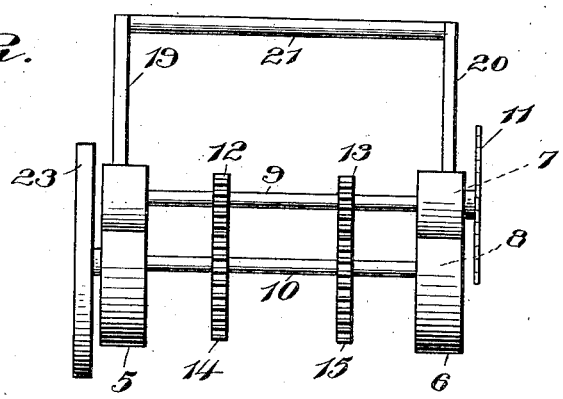
Figure 3:
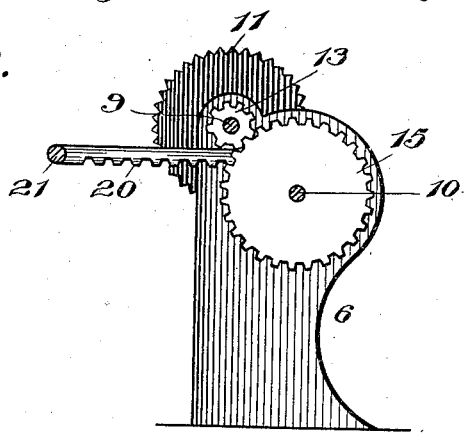

In the drawings forming a portion of this specification, and in which like numerals of reference indicate similar parts in the several views, Figure 1 is an elevation of the machine and showing the side opposite to the handle. Fig. 2 is a top plan view. Fig. 3 is a section on line 3 3 of Fig. 1.

Referring now to the drawings, the present machine comprises spaced uprights 5 and 6, each of which has two bearings 7 and 8, the bearings 7 being in higher planes than the bearings 8. These uprights or supports are disposed parallel, and in the bearings 7 is mounted a saw-shaft 9, while a drive-shaft 10 is mounted in the bearings 8, these shafts being thus supported one in a higher plane than the other, the shaft 10 being offset laterally from the shaft 9. On the shaft 9 is fixed a circular saw 11 of usual form, which lies beyond the outer face of the upright 6, while upon said shaft and fixed thereto between the uprights are the pinions 12 and 13, with which engage the gears 14 and 15 on the shaft 10, said shaft 10 being provided with a fly-wheel 23.

The uprights 5 and 6 are slotted, as shown, and within the slots of the uprights and mounted upon the shaft 10 are pinions 16, which are connected to rotate with the shaft in one direction by means of spring-pawls 17, which are pivoted to the pinions and lie with their free engaging ends in operative relation to the ratchet-wheels 18, fixed on the shaft. Thus when the pinions 16 are rotated rearwardly they move independently of the shaft; but when such pinions are rotated forwardly the shaft is rotated, due to the engagement of the pawls with their respective ratchets, the fly-wheel insuring continuous rotation of the shaft 10.

Rack-bars 19 and 20 are provided and are slidably mounted in the slots of the uprights above the pinions therein, and these racks are engaged with the pinions, so that when the racks are reciprocated to oscillate the pinions the pawls will first engage and then release their respective ratchet-wheels and the shaft 10 will be urged to rotate in a continuous direction, and by reason of the engagement of the gears and pinions on the shafts 9 and 10 the shaft 9 will be continuously rotated, as will also the saw carried thereby.

To facilitate operation of the rack-bars simultaneously, they are connected by the transverse handle 21.

It will be understood that in practice modifications of the specific construction shown may be made and that any suitable materials and proportions may be used for the various parts without departing from the spirit of the invention.

What is claimed is—

A sawing-machine comprising spaced uprights each having spaced bearings and a guideway, a shaft disposed in one pair of bearings and having a saw, a shaft journaled in the second pair of bearings and having a fly-wheel, gears connecting the shafts, pinions mounted upon the second shaft, pawl-and-ratchet connections between the pinions and the second shaft to permit free movement of the pinions in one and the same direction and rack-bars slidably mounted in the guideways and engaged with the pinions, said rack-bars having a connecting-handle or cross-bar.

In testimony whereof I affix my signature in presence of two witnesses.

WILLIE O. WILLIAMS.

Witnesses:
JNO. S. WHETSTON,
THEODORE THOMPSON.